United States Patent

(12) United States Patent
Ibison

(10) Patent No.: US 9,509,541 B1
(45) Date of Patent: Nov. 29, 2016

(54) CREST FACTOR REDUCTION

(71) Applicant: Altiostar Networks, Inc., Tewksbury, MA (US)

(72) Inventor: John N. Ibison, Bradford (GB)

(73) Assignee: AltioStar Networks, Inc., Tewksbury, MA (US)

( * ) Notice: Subject to any disclaimer, the term of this patent is extended or adjusted under 35 U.S.C. 154(b) by 0 days.

(21) Appl. No.: 14/822,808

(22) Filed: Aug. 10, 2015

(51) Int. Cl.
*H04K 1/10* (2006.01)
*H04L 27/26* (2006.01)
*G06F 17/18* (2006.01)

(52) U.S. Cl.
CPC ........... *H04L 27/2623* (2013.01); *G06F 17/18* (2013.01); *H04L 27/2614* (2013.01)

(58) Field of Classification Search
CPC ..... H04L 5/00; H04L 27/367; H04L 1/0026; H04L 1/20; H04L 1/0003; H04L 1/0009; H04L 27/2623; H04L 27/3411; H04L 27/2626; H04L 27/2624; H04B 15/00; H04B 1/0475; H04B 1/525; H04B 7/0465; H04W 24/00; H03F 1/3241; H03F 1/32; H03F 1/3247
USPC .............. 375/285, 295, 296, 297; 455/67.13, 455/114.2, 114.3, 115.1
See application file for complete search history.

(56) References Cited

U.S. PATENT DOCUMENTS

| | | | | |
|---|---|---|---|---|
| 7,586,995 B1* | 9/2009 | Mauer | ................. | H04L 27/3411 375/261 |
| 8,958,500 B2* | 2/2015 | Huang | ................. | H03G 3/3042 375/297 |
| 2008/0159421 A1* | 7/2008 | Chen | ................... | H04L 27/2614 375/260 |
| 2008/0247487 A1* | 10/2008 | Cai | ..................... | H04L 27/2623 375/296 |
| 2011/0228872 A1* | 9/2011 | Soler Garrido | ..... | H04L 27/2623 375/295 |
| 2014/0044215 A1* | 2/2014 | Mundarath | ......... | H04L 27/2624 375/297 |
| 2014/0270016 A1* | 9/2014 | Piazzi | ..................... | H04B 1/10 375/346 |
| 2014/0362951 A1* | 12/2014 | Fehri | ................... | H04L 27/2623 375/297 |

* cited by examiner

*Primary Examiner* — Khanh C Tran
(74) *Attorney, Agent, or Firm* — Mintz Levin Cohn Ferris Glovsky and Popeo, P.C.

(57) ABSTRACT

A method is presented which performs crest factor reduction (CFR) on a digitized signal. The method may include determining one or more peak values in a series of data samples of a communication signal, and/or generating a peak queue comprising the one or more peak values that exceed a threshold value and a corresponding index values for each peak value. The method may further include generating, from the peak queue, an entry to a clip table, the entry including a clip coefficient at the corresponding index value, updating the clip table to include a new clip coefficient at a new corresponding index value when the clip function squared at the new index value exceeds a scaled output power for an input power at the new corresponding index value, and/or clipping the series of data samples in a neighborhood of the peak value according to the clip function.

30 Claims, 7 Drawing Sheets

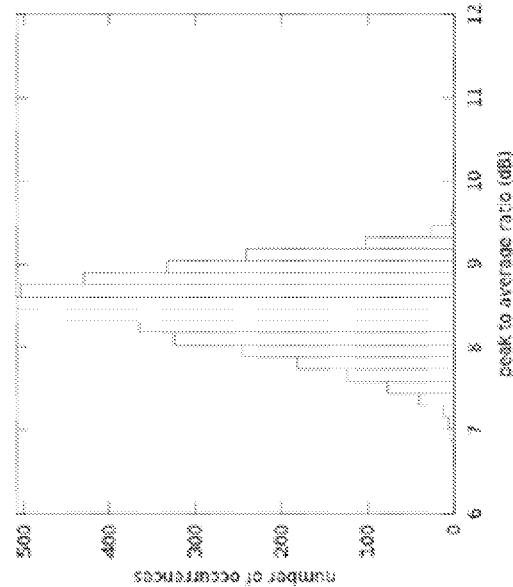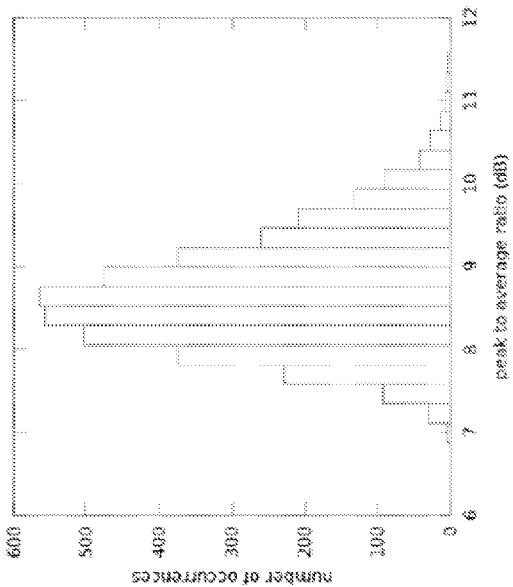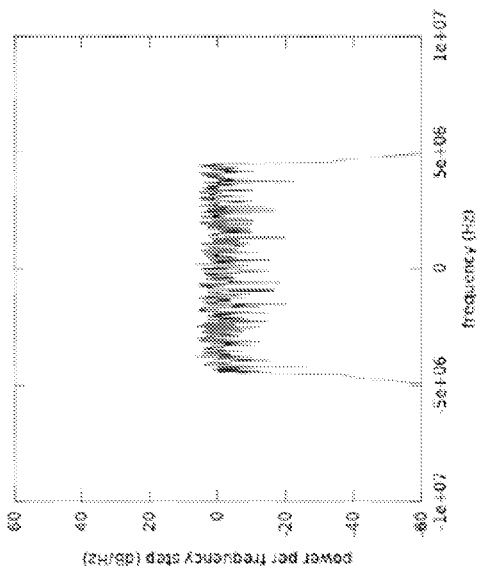
FIG. 4A
FIG. 4B
FIG. 4C
FIGs. 4A-4C

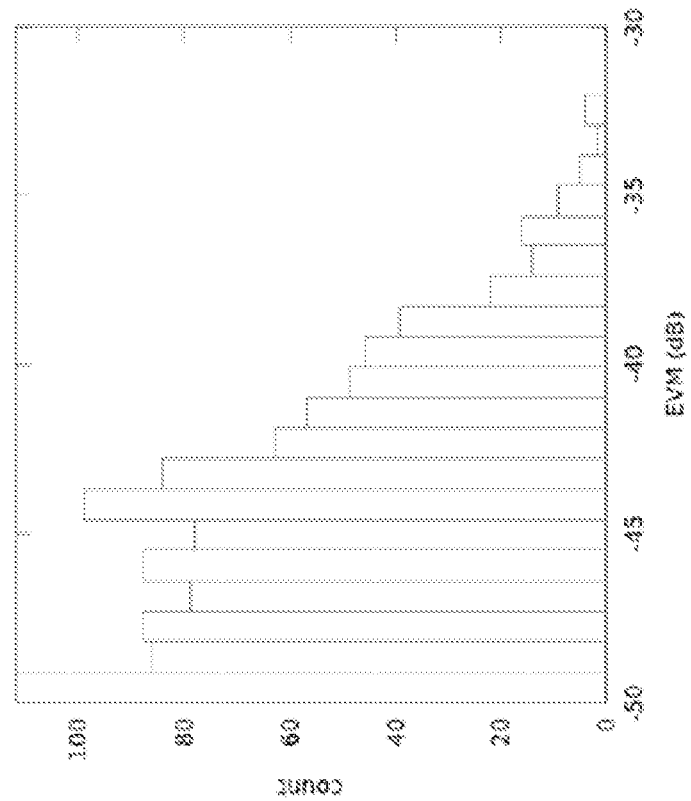
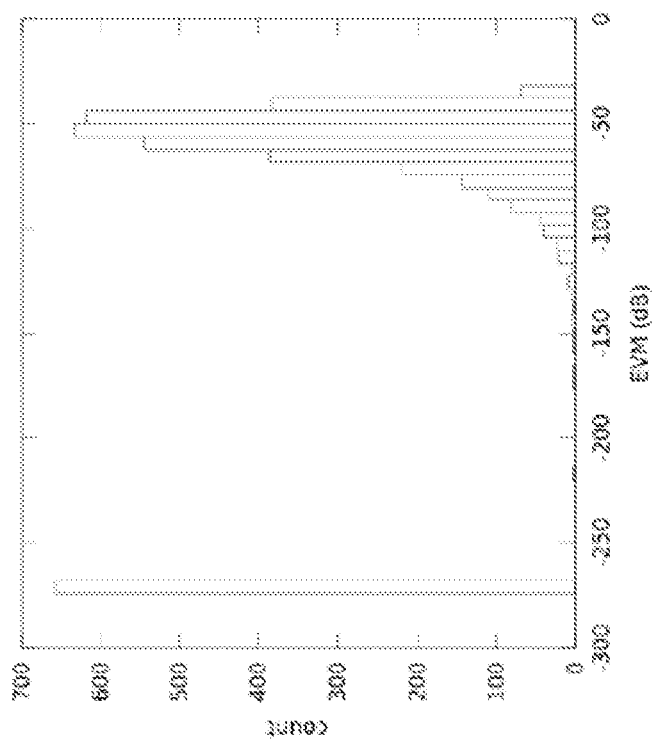
FIG. 5B
FIG. 5A
FIGs. 5A-5B

CREST FACTOR REDUCTION

TECHNICAL FIELD

In some example embodiments, the subject matter herein generally relates to the transmission of digital data signals, and in particular, to limiting the values of the peaks in power of the digital data signals entering an amplifier to assist with digital pre-distortion, to reduce the peak to average ratio, and to improve amplifier efficiency.

BACKGROUND

The peak-to-average ratio ("PAR") of a radio frequency input signal to an amplifier affects the output power from the amplifier, the power efficiency of the amplifier, and the distortion in the output of the amplifier. The peak-to-average ratio of the input signal to an amplifier may vary over time due to the modulation of a carrier according to the input signal. Peaks in the input signal may cause the amplifier to enter saturation with higher peaks causing the amplifier to go further into saturation. The amplifier saturation causes distortion of the amplifier output which affects the frequency spectrum of the output. To help prevent the amplifier from entering saturation, the input signal may be "backed-off" so that the peaks of the input signal do not cause the amplifier to enter saturation. As a result, the average power output from the amplifier is reduced which decreases the output power of the amplifier and decreases the power efficiency of the amplifier. Input signals with low peak-to-average ratios can be amplified with less back-off and can thus produce more output power with a higher power efficiency, and affect the spectrum of the output less than high peak-to-average input signals.

SUMMARY

In one aspect there is a method. The method may include determining one or more peak values in a series of data samples of a communication signal, and/or generating a peak queue comprising the one or more peak values that exceed a threshold value and a corresponding index value for each peak value. The method may further include generating, from the peak queue, an entry to a clip table, the entry including a clip coefficient at the corresponding index value, updating the clip table to include a new clip coefficient at a new corresponding index value when the clip function squared at the new index value exceeds a scaled output power for an input power at the new corresponding index value, and/or clipping the series of data samples in a neighborhood of the peak value according to the clip function.

One or more of the following features can be included in any feasible combination. The method may include removing a selected entry from the clip table when the selected entry does not affect the series of data samples, and/or determining a clip function from at least the clip table, the clip coefficient, and a clip pulse. The peak value may be determined from a current data value at a current index value and earlier data samples at two immediately preceding index values. The clip table may include the clip coefficient value at the corresponding index value for the peak value according to the clip table of equation 15. The clip function $C(k)$ at a first corresponding index value k may be calculated according to equation 16. The clip coefficient, $K_n$, may be calculated according to equation 19. The clip pulse, $C_n(k)$, may be calculated according to equation 2. The scaled output power $R(p)$ for input power p may be calculated according to equation 3. The neighborhood of the peak value may include index values between the integer value A less than the corresponding index value and the integer value A more than the corresponding index value.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 4A depicts an example peak-to-average ratio distribution of a raw input signal, in accordance with some example embodiments;

FIG. 4B depicts an example peak-to-average distribution of a clipped signal, in accordance with some example embodiments;

FIG. 4C depicts an example of power spectral density of a clipped signal with poor error vector magnitude score, in accordance with some example embodiments;

FIG. 5A depicts an example of an error vector magnitude distribution, in accordance with some example embodiments;

FIG. 5B depicts an example of an expanded view of the upper range shown in FIG. 5A, in accordance with some example embodiments;

DETAILED DESCRIPTION

Figure 1:
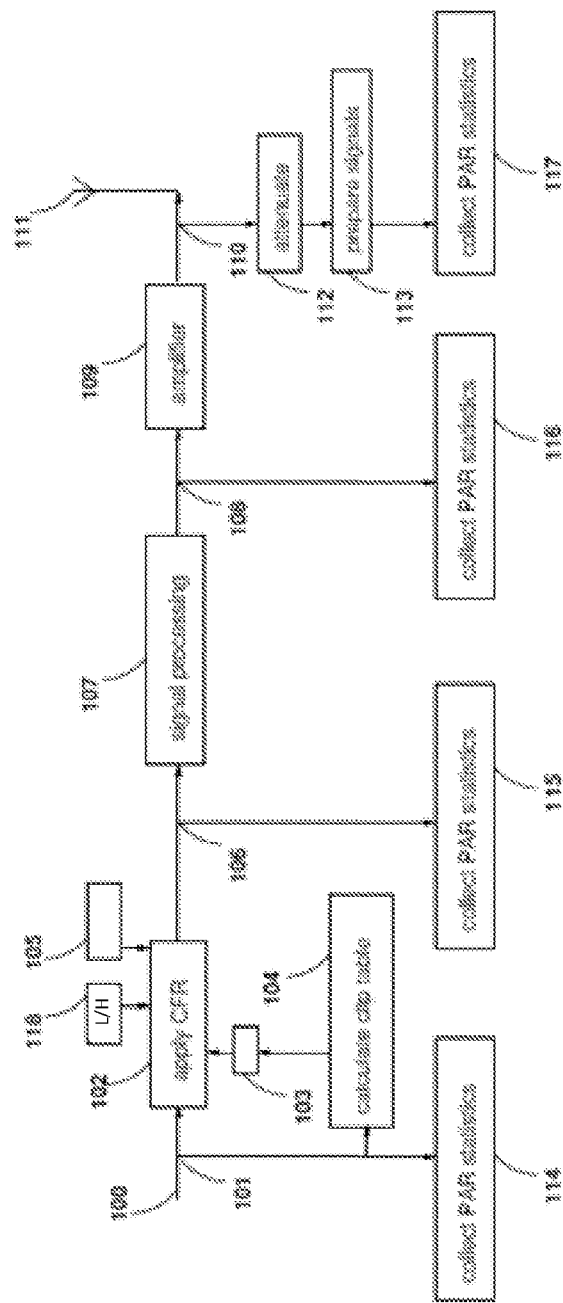
FIG. 1 depicts an example of a transmitter including crest factor reduction, in accordance with some example embodiments.

Crest factor reduction may refer to reducing the peak power of a time varying signal. Crest factor reduction consistent with the subject matter disclosed herein may reduce the highest peaks in an input signal to an amplifier so that the input signal has a smaller dynamic range. Some example embodiments may reduce (or clip) the highest peaks of an orthogonal frequency division multiplexed ("OFDM") signal such as an OFDM signal according to a 3GPP long-term evolution ("LTE") standard and/or a standard from the WiMAX/WiFi families of standards. By clipping the highest peaks of a signal, the peak-to-average power ratio of the signal may also be reduced. The crest factor reduction disclosed herein may also be applied to any other signal with high peak to average ratio. In some example embodiments, the crest factor reduction disclosed herein reduces the spectral expansion caused by the amplifier by reducing the peak-to-average ratio of the input signal to the amplifier. For example, the crest factor reduction disclosed herein avoids the high peak to average ratios that cause spectral expansion due to the non-linearity of the amplifier when in saturation. Reducing the highest peaks of an input signal may increase the power efficiency of the amplifier and the output power of the amplifier.

In some example embodiments, the peak-to-average ratio ("PAR") of a digitized signal may be reduced to a target value PAR. For example, a clipping function may be applied to samples of an input signal before the samples enter an amplifier. The clipping function may reduce the powers of peaks in the input samples that have powers above a threshold value. Samples of the input signal may be multiplied in the time-domain by the clipping function to produce samples with lower values. The clipping function may be constructed to clip the power of the samples in a neighborhood around each peak that is above the threshold. For example, the clipping function may clip the power at the data sample with an index corresponding to the peak value. Data samples at index values within a predetermined number of index values greater than the index value of the peak and less than the index value of the peak may be clipped according to the clipping function. The following example may be used to illustrate. The peak value may occur at index value 512, and the clipping function may be configured to clip the data samples at indexes within 16 index values of the peak. In this illustrative example, the clipping function may adjust data samples corresponding to index values between 496 and 528. The values of the data samples at each index between 496 and 528 may be adjusted according to the clipping function. In this example, the neighborhood of the peak value may include the data values between indexes 496 and 528. The shape of the clipping function may be chosen to reduce the spectral expansion of the amplifier output signal outside the bandwidth of the input samples. The shape in the time-domain of the clipping function may be determined by a clip pulse shape.

FIG. 1 depicts an example of a transmitter output stage 14 that includes crest factor reduction and power amplification, in accordance with some example embodiments. A series of input samples representing an input signal enter the transmitter output stage 14. In some example embodiments, the samples may represent a modulated signal or input signal ready for power amplification before being transmitted. The modulated or input signal, and thus the samples (also referred to herein as "data samples") of the modulated or input signal, may have peaks in the sample power due to the modulation or due to signal processing such as interpolation performed on the samples before being set to the transmitter output stage 14. The crest factor reduction in the output stage 14 may reduce the powers of the peaks in the samples in order to reduce or control the peak-to-average ratio of the signal. In some example embodiments, the peak-to-average ratio of the samples may be determined at various points in the transmitter output stage 14.

The clip function may be constructed so that the power of the product of the clip function and a sample of the input signal 100 is less than a predetermined upper threshold. The clip function may be constructed so that the product of the clip function at the input sample index and the input sample power is reduced in power compared to the input sample power. In addition to the peak input sample being reduced by the clip function, the input samples in a neighborhood of samples around the peak are also reduced according to the shape of the clip function determined at least in part by a clip pulse. In some example embodiments, by selecting the shape of the clip pulse to be wide, a wider neighborhood of the peak input sample is reduced in power. A smoothly shaped clip pulse such as a Gaussian shape may reduce the spectral expansion due to the clipping as well as reduce the spectral expansion due to a high peak-to-average ratio of the input samples. For example, the clip pulse may be selected so that the spectral expansion may be kept within a predefined spectral mask.

At 118, two predetermined power levels (L and H) are stored. The predetermined values stored for L and H may be configurable. In some example embodiments, peaks below the L power level may be low enough that the clip signal is not applied. For example, the L power level may be selected so that 99.9% of all input samples have less power than L. In some example embodiments, H is the maximum power allowed for any clipped peak resulting from crest factor reduction. The value of H is greater than or equal to L.

At 105 a digital representation of the clip pulse is stored. In some example embodiments, the clip pulse is a bell shaped curve such as a Gaussian multiplied by a Kaiser window. Other clip pulse shapes are also possible. In some example embodiments, the clip pulse shape may rise to a value of 1 in the center, and may fall to zero at each edge.

In some example embodiments, the clip pulse 105 is bell-shaped and may be symmetric about a center point. Due to the symmetry, a digital representation of only one half of the clip pulse may need to be stored at 105. For example, the clip pulse may be represented by values in a table accessed by an index. Successive index values may represent successive time samples of the clip pulse. For example, the clip pulse may be a bell-shaped curve such as a windowed Gaussian that may be expressed as:

$$B_b = w_b G_b, \tag{1A}$$

where the Gaussian may be expressed as:

$$G_b = e^{-\frac{1}{2}(b/s)^2}, \tag{1B}$$

and a windowing function such as the Kaiser window is defined using the modified Bessel functions of the first kind as:

$$w_b = \begin{cases} \dfrac{I_0\left(\pi a\sqrt{1-\left(\dfrac{2b}{A}\right)^2}\right)}{I_0(\pi a)} & \text{between } \dfrac{-A}{2} \le b \le \dfrac{A}{2} \\ 0 & \text{otherwise.} \end{cases} \quad (1C)$$

The parameters a, s, and A are chosen based upon the bandwidth of the signal to be clipped and the sampling frequency. The clip pulse formed needs to be wide enough both to clip the peaks and to prevent spectral growth. Equations 1-3 satisfy:

$B_b$=clip pulse at sample point $b$ where $b=0,1,\ldots$ $(A-1)$, and $B_0=1$. (1D)

where integer A is the semi-width of the clip pulse in index value. For a symmetric clip pulse, the value of the clip pulse at sample point k may be defined as:

$$C_n(k) = \begin{cases} B_{|n-k|} & \text{if } |n-k| < A \\ 0 & \text{otherwise} \end{cases} \quad (2)$$

where |n−k| is the offset index value from the peak, and the semi-width, A, may have an integer value equal to the half the width of the clip pulse in index value, n is the sample number of the pulse peak, and k is the sample number of the data signal where it gets applied. For example, if the width of the clip pulse is 50 samples, semi-width A may have a value of 25.

By multiplying the input samples by the clip function with shape determined by the clip pulse, the peaks in the input samples with power level p above L, may be mapped onto the range [L, H] according to the following:

$R(p)=H-(H-L)e^{-(p-L)/(H-L)}$ (3)

R(p) may be referred to herein as the maximum scaled power for input power p. The properties of R(p) in equation 3 include the following:

$R(L)=L,$ (4)

$R(p)<p, \forall p > L,$ (5)

$R(p) \nearrow H$ as $p \nearrow \infty.$ (6)

Equation 4 may be interpreted as meaning that an input power level of p=L may be mapped to an output power level of L. Equation 5 may be interpreted as meaning that all input power levels, p, that are above L are mapped to an output power level less than p. Equation 6 may be interpreted as meaning that as the input power level, p, increases to high levels, the output power level approaches H. The output power level may never exceed H.

In some example embodiments, a radio frequency signal may be constructed by summing in-phase (I) and quadrature (Q) components. In some multi-carrier modulations such as orthogonal frequency division multiplexing (OFDM), the distribution of powers of the I and Q components may be normally distributed. The power may then be proportional to the squares of the powers, and the total power may be expressed as the sum of the squared powers. In some example embodiments, the total power may be represented by a chi-squared distribution with two degrees of freedom. The probability density function of the power may be expressed according to the following:

$$f(p) = \begin{cases} \dfrac{1}{2}e^{-p/2} & \text{for } p \ge 0 \\ 0 & \text{otherwise} \end{cases} \quad (7)$$

Equation 7 has a similar exponential form to equation 3. As such, equation 3 may, in some embodiments, be used to estimate equation 7.

Statistics about the PAR of the input signal 100 may be determined at 114. Based on the input samples 100, a clip table may be calculated at 104. The clip table may be stored at 103. At 102, the clip function may be determined from the clip table stored at 103, clip pulse 105, and the peak limits (H and L) 118. The clip function may be applied to the samples 100 at 102 to produce output samples 106.

After the crest factor reduction has been applied at 102, peak to average ratio statistics may be gathered at 115. At 107, signal processing may be performed on the clipped signal 106. The signal processing may include quadrature error correction, digital pre-distortion ("DPD"), and/or filtering that may, along with the clipping, cause the spectrum of the output of amplifier 109 to match or nearly match the spectrum of the input signal 100. Moreover, signal processing 107 may reduce any spectral expansion due to the clipping. The peak to average ratio statistics after signal processing 107 are collected at 108 by 116. The output samples are amplified by amplifier 109 and then transmitted via antenna 111. After amplification by amplifier 109, a portion of the output from amplifier 109 is passed through coupler 110, attenuator 112, and signal preparation 113, before the peak to average ratio statistics are collected at 117. Attenuator 112 and signal preparation 113 ensure that the signal power is in the correct power range for 117. In some example embodiments, the peak to average ratio statistics are gathered at 101, 106, and 108 may be used to generate a combined cumulative density ("CCDF") function representing distributions of the sample peaks.

Figure 2:
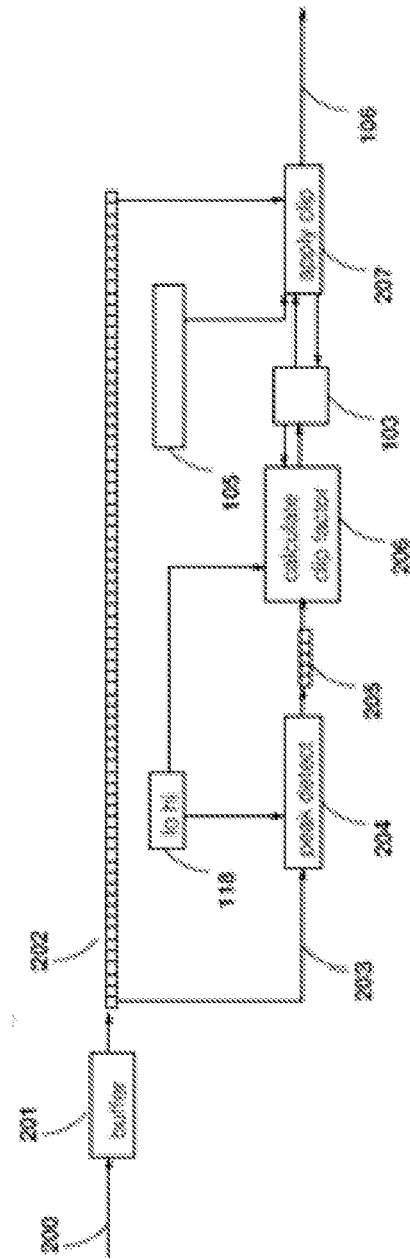
FIG. 2 depicts crest factor reduction, in accordance with some example embodiments.

FIG. 2 depicts crest factor reduction, in accordance with some example embodiments. Some aspects of FIG. 2 refer to FIG. 1. Input samples 200 may be buffered by buffers 201 and 202. Buffering may allow for processing latency in the crest factor reduction. The buffering may allow time for signal processing to occur with a longer buffer allowing for more signal processing and/or more complex signal processing calculations. For example, buffering may allow a clip factor calculator to operate on samples sequentially rather than having to operate in parallel on more than one sample at the same time. In another example, the resources required in a field-programmable gate array may be reduced when buffering is used.

Each buffered sample 202 may enter peak detector 204. Peak detector 204 may determine if the sample corresponds to a peak. If the sample does correspond to a peak, peak detector 204 may determine if the peak is above the lower threshold value L. Peak detector 204 may determine if a peak is present at the previous sample from just the current sample power and the previous two sample powers. The samples (a, b, and c) may be expressed as:

$c=|x_{k-2}|^2$ (8)

$b=|x_{k-1}|^2$ (9)

$a=|x_k|^2$ (10)

Peak detector 204 may determine if a peak is present from the power of the current input sample and the previous two input samples where the $k^{th}$ sample, a, is the current sample, the $(k-1)^{th}$ sample, b, is the previous sample, and the $(k-2)^{th}$ sample, c, is the sample before the previous sample. k may be an index for the input samples. In accordance with some example embodiments, FIG. 3 further details the peak detector 204.

Each time a new sample is received the values in a, b, and c may be shifted according to the following:

$$b \to c, \quad (11)$$

$$a \to b, \quad (12)$$

$$|x_k|^2 \to a. \quad (13)$$

When the values are shifted, the value of c before the shift may be discarded and replaced with the value of b as shown in equation 11. Initially, the values may be zero which may be expressed as the following:

$$(a,b,c)=(0,0,0). \quad (14)$$

In some example embodiments, peak queue 205 may be a significantly shorter buffer than buffer 202 because the clip threshold L may be set so that L is above most of the input samples. For example, L may be set to be a value equal to, or above, 99.9% of the input samples. In this example, 0.1% of the samples may be at a power that is at or above the threshold L. For a peak having power above the threshold L, the sample number n and the sample power $P_n$ are stored in the peak queue.

Based on the peak queue 205, lower threshold L at 118, and upper threshold H at 118, calculator 206 may calculate clip table 103. Calculator 206 may also update clip table 103 when new peaks are found in the series of data samples. Clip table 103 may include clip coefficients $K_n$ for the peaks with sample index n. The clip table 103 may be expressed as:

$$\text{ClipTable}=\{(n, K_n) \text{ for all active peaks at positions } n\}. \quad (15)$$

Combining equation 15 with equation 2, and clip table 103, the clip function may be expressed as:

$$C(k)=\Pi_{(n,K_n) \in ClipTable}(1-K_n C_n(k)), \quad (16)$$

where C(k) is the clip function value at sample k, $K_n$ is the clip coefficient for the peak at sample index n, and $C_n(k)$ is the clip pulse for the peak at sample index n as given by equation 2. In some example embodiments, the clip function value, C(k), may be multiplied by an input sample to clip the sample. The clipped input sample may be expressed as the following:

$$x_k \mapsto x_k C(k), \quad (17)$$

where the input sample $x_k$ is replaced by the clipped input signal $x_k C(k)$.

New peaks may be added by calculator 206 to clip table 103 when they are detected in peak queue 205. Calculator 206 may take a pair of values (n, $P_n$) from the peak queue 205 and perform an update to clip table 103 according to the following:

$$ClipTable \mapsto \begin{cases} ClipTable \cup \{(n, K_n)\} & \text{if } C^2(n)P_n > R(P_n) \\ & \text{where } P_n = |x_n|^2 \\ ClipTable & \text{otherwise} \end{cases} \quad (18)$$

where C(k) may be the clip function in equation 16, $R(P_n)$ may be determined by equation 3, k is a sample index, and $P_k$ is the power in the $k^{th}$ sample, and $K_n$ may be defined by the following:

$$K_n = 1 - \frac{1}{C(n)}\sqrt{\frac{R(P_n)}{P_n}}, \quad (19)$$

where the C(n) in equation 19 is calculated from the pre-updated clip table. Thus, the updated clip table shown on the left-hand side of equation 18 is an extension of the pre-updated clip table by adding a new pair (n, $K_n$) shown on the right-hand side of equation 18.

Equation 18 may express that the clip table 103 at sample index k may be updated if the peak at index k is clipped to power exceeding $R(P_k)$ by the current clip table. If an update is needed, then a new clip coefficient, $K_k$, is chosen so that the new peak is clipped to have sample power $R(P_k)$. By updating the clip table at k, the clip function, C(n), may be changed to C'(n) according to the following:

$$C(n) \mapsto C'(n)=(1-K_n)C(n), \quad (20)$$

and the peak sample power at index k is changed according to:

$$x_n \mapsto C'(k)x_k=(1-K_n)C(n)X_k. \quad (21)$$

Using equation 19, the updated power at sample k may be expressed according to the following:

$$P_n \mapsto (1-K_n)^2 C^2(n)P_n=R(P_n). \quad (21A)$$

Old peaks may be removed by calculator 206 from clip table 103 when they no longer can affect the current sample as index k according to, $$ClipTable \mapsto \begin{cases} ClipTable/\{(n, K_n)\} & \text{if } n < k - A \\ ClipTable & \text{otherwise} \end{cases}. \quad (22)$$

Clipper 207 may apply clip pulse 105 to input samples 202 according to a clip table to produce output samples 106. Clipper 207, may process a current sample with index k, and removes an entry from the clip table 103 having sample number m whenever to following occurs:

$$k-m>A. \quad (23)$$

Clipper 207 may clip the sample at index number c using equation 17 according to:

$$x_k \mapsto C(k)x_k, \quad (24)$$

where C(k) is the clip function at index k and $x_k$ is the sample before the clipping. The clipped samples may then output at 106. Old peaks may be removed at 207 from clip table 103 when they have no more influence on the input samples.

Figure 3:
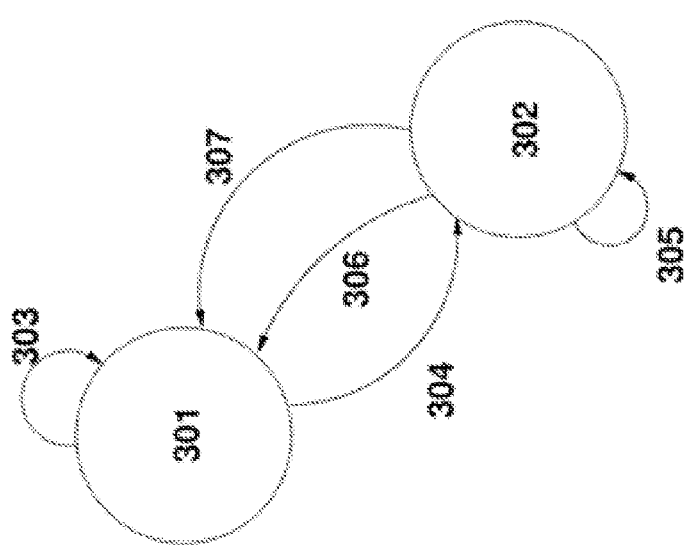
FIG. 3 depicts a state machine for peak detection, in accordance with some example embodiments.

Peak detector 204 may include the state machine depicted in FIG. 3. The state machine may have two states. State 301 can correspond to the current sample not increasing in power relative to the previous sample. State 302 can correspond to the current sample increasing in power relative to the previous sample.

Table I depicts the state changes of the state machine in peak detector 204 based on a, b, and c described in equations 8-10. A change in state may be triggered by the arrival of a new sample. The transitions in the state diagram shown in FIG. 3 are shown in Table I below. State transitions may be performed based on the associated condition being satisfied.

TABLE I

Peak Detector State Transition Table

| transition | from state | to state | condition | action |
|---|---|---|---|---|
| 303 | 301 | 301 | a ≤ b | none |
| 304 | 301 | 302 | a > b | none |
| 305 | 302 | 302 | a ≥ b | none |
| 306 | 302 | 301 | a < b & b ≤ L | none |
| 307 | 302 | 301 | a < b & b > L | add the pair (k-1, b) to the peak queue 205 |

FIGS. 4-8 show results, in accordance with some example embodiments. For example, some of the results include an input signal corresponding to a 64 QAM (quadrature power modulation) encoded signal for 600 sub-carriers using random data. In this example, the sub-carrier frequency gap is 15 kHz. In the example the signal may be similar to a 3GPP Long Term Evolution ("LTE") signal with a 10 MHz channel bandwidth. For each of the 4000 signals: 1) the PAR may be calculated; 2) the signal may be clipped using the crest factor reduction described above; 3) the PAR of the clipped signal may be calculated; 4) the error voltage magnitude is calculated from the clipped signal; 5) the signal having the worst error vector magnitude score may be recorded along with the power spectral density for this signal.

FIG. 4A depicts an example of a distribution of PAR for input samples before clipping. FIG. 4B depicts an example distribution of PAR after clipping. Comparing FIG. 4B to FIG. 4A, the average PAR has been reduced in FIG. 4B, and the tail of the distribution decreases faster for large PAR values. In some example embodiments, the crest factor reduction may clip the signal samples and thus reduce the PAR compared to the input samples.

FIG. 4C depicts an example of the power spectral density for the worst of 4000 simulated signals having the highest error vector magnitude ("EVM") score. Even for this worst signal, the clipped samples may still be kept within the 10 MHz channel bandwidth (required by the spectral mask for an LTE signal).

FIG. 5A depicts an example of a distribution of EVM scores (where the lower the value the better). FIG. 5B depicts an upper range of the EVM distribution. In this example, the chance of getting an EVM score of worse (higher) than −35 dB is less than 0.3%.

In foregoing example, the following configuration was used. The clip pulse 105 had a length of 129 samples. Accordingly, 65 stored clip pulse values were sufficient to specify a symmetric pulse. The clip pulse 105 in this example was formed as a product of a Kaiser window (with M=128, and a=8) (see equation (25)) with a Gaussian (s=64/3) (see equation (26)). The clip thresholds 118 in this example were L=8.0 dB above the mean signal power, H=9.3 dB above the mean signal power. The Kaiser window in this example was defined using a modified Bessel function of the first kind according to the following:

$$u'_n = \begin{cases} \dfrac{I_0\left(\pi a\sqrt{1-\left(\dfrac{2n}{M}\right)^2}\right)}{I_0(\pi a)} & \dfrac{-M}{2} \leq n \leq \dfrac{M}{2} \\ 0 & \text{otherwise} \end{cases} \quad (25)$$

A Gaussian may be defined according to the following:

$$G_n = e^{-1/2(n/s)^2} \quad (26)$$

Figure 6:
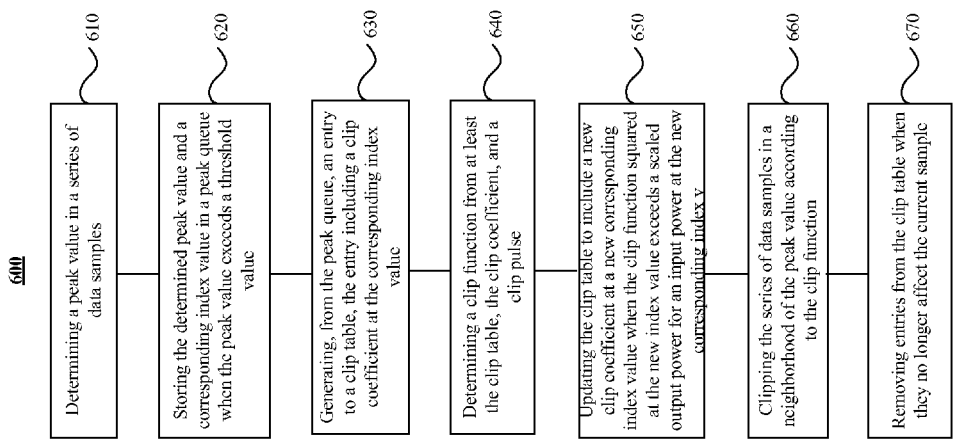
FIG. 6 depicts a process, in accordance with some example embodiments.

FIG. 6 depicts a process 600 for crest factor reduction, in accordance with some example embodiments. The description of FIG. 6 includes aspects described in FIGS. 1-3. At 610, a series of data samples representing a signal to be transmitted may enter a crest factor reducer. Each data sample may have an power value and an index value. At 610, peaks in the power may be determined in the series of data samples. At 620, the determined peaks and their corresponding sample index values may be stored in a peak queue. At 630, a calculator may determine a clip table for the peaks in the peak queue. At 640, a clip function may be determined. At 650, when a clip function squared multiplied by the power at the data sample is greater than the maximum scaled output power, the clip table may be updated to include the peak at sample k, with clip coefficient K. The update to the clip table may occur when the peak has not been clipped enough to be below, or equal to, the maximum scaled output power. At 660, the clipping may be applied by multiplying the data sample by the clip function. At 670, entries are removed from the clip table when they can no longer affect the clipping of the current sample.

At 610, a series of data samples representing a signal to be transmitted may enter a buffer such as buffers 201 and 202 at a crest factor reducer such as crest factor reducer 210. Buffers 201 and 202 may provide a processing delay to accommodate processing time needed by the crest factor reducer. Each data sample may have a power value and an index value. For example, the power of a data sample may be a digital representation proportional to a voltage, or current. The data sample power may represent a voltage output from a modulator or combination of modulators. The sample index may be an integer value representing a time corresponding to the data sample. In some example embodiments, peaks in the power of the data samples may be determined in accordance with FIG. 3.

At 620, the determined sample peak powers and the corresponding sample index values may be stored in a peak queue. For example, the peak queue may include peaks that are above a lower threshold power value L detailed above with respect to 118. Sample power peaks that are greater than or equal to the threshold value L may be stored in the peak queue as well as the corresponding sample index value for the peak. In some example embodiments, the peak power values and the sample index values may be stored in accordance with FIG. 3.

At 630, a calculator such as calculator 206 may determine a clip table for the peaks in the peak queue such as peak queue 205. In some example embodiments, the clip table may be determined from the peaks in the peak queue according to equation 15. For example, the clip table may include for each peak in the peak queue the sample index, k, for the peak and the clip coefficient, $K_k$, for the peak.

At 640, a clip function in may be determined from the clip table. In some example embodiments, a clip function such as the clip function in equation 16 may be determined from the clip pulse, equation 2, and clip coefficients $K_k$. The clip coefficients, $K_k$, may be determined from equation 19.

At 650, the clip table may be updated when a clip function squared at sample k multiplied by the at sample power $P_k$ is greater than the scaled output power $R(P_k)$. In some example embodiments the sample power may be determined as proportional to the square of the sample power $x_k$, and $R(P_k)$ may be determined from equation 3. In some example embodiments, the update may include the index, k, for the sample peak, and clip coefficient, $K_k$, which may be determined from equation 19. In some example embodiments, the clip table is updated at sample k when the sample power exceeds the maximum value $R(P_k)$ in equation 3.

At 660, the clipping may be applied to an output sample 105 by multiplying the sample $x_k$ by clip function $C(k)$. In some example embodiments, $C(k)$, is determined by equation 16. By multiplying the clipping function by the samples, the power of the product may not exceed the input sample power, and may be bounded by threshold, H, and the peak to average ratio of the output samples is reduced.

At 670, one or more entries in the clip table are removed when the one or more entries may no longer influence the current sample because the one or more entries are more than a semi-pulse, A, number of samples away from the current sample.

Figure 7:
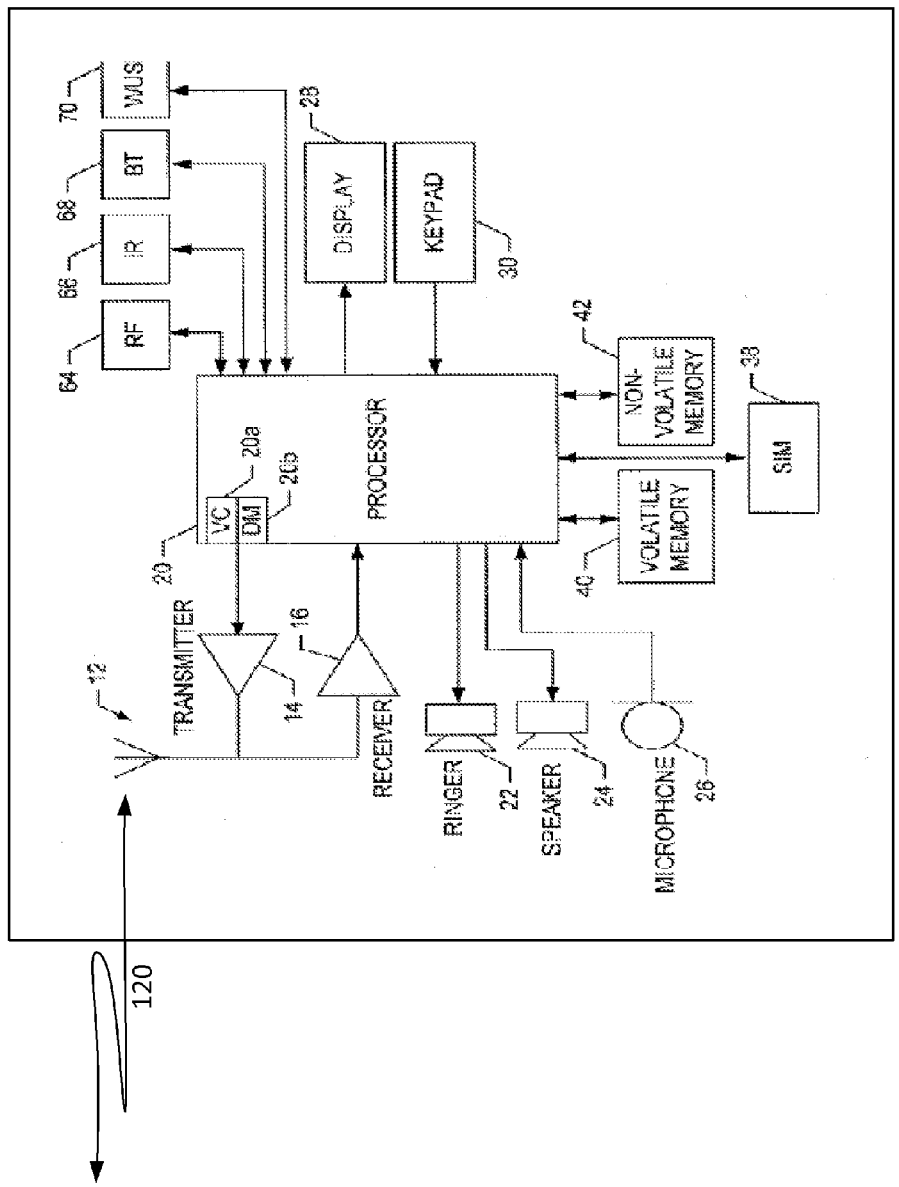
FIG. 7 depicts an example of an apparatus, in accordance with some example embodiments.

FIG. 7 depicts an apparatus 700, in accordance with some example embodiments. Apparatus 700 may be implemented in a remote radio head, base station, Node B, Enhanced Node B, user equipment, mobile station, mobile device, wireless modem, wired modem, access point, wireless router, and/or any other communications device. The apparatus 700 may include at least one antenna 12, a transmitter 14, and a receiver 16. Alternatively transmit and receive antennas may be separate. The apparatus 700 may also include a processor 20 configured to provide signals to and from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of another apparatus by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Apparatus 700 may include a location processor and/or an interface to obtain location information, such as positioning and/or navigation information. Accordingly, although illustrated in FIG. 7 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as, Institute of Electrical and Electronics Engineers (IEEE) 802.11, 802.16, and/or the like. In addition, these signals may include speech data, user generated data, user requested data, and/or the like.

The apparatus 700 may be capable of operating with one or more air interface standards, communication protocols, modulation types, access types, and/or the like. For example, the apparatus 700 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem ("IMS") communication protocols (for example, session initiation protocol ("SIP")) and/or the like. For example, the apparatus 700 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 700 may be capable of operating in accordance with 2.5G wireless communication protocols General Packet Radio Service ("GPRS"), Enhanced Data GSM Environment ("EDGE"), and/or the like. Further, for example, the apparatus 700 may be capable of operating in accordance with 3G wireless communication protocols, such as, Universal Mobile Telecommunications System ("UMTS"), Code Division Multiple Access 2000 ("CDMA2000"), Wideband Code Division Multiple Access ("WCDMA"), Time Division-Synchronous Code Division Multiple Access ("TD-SCDMA"), and/or the like. The apparatus 700 may be additionally capable of operating in accordance with 3.9G wireless communication protocols, such as, Long Term Evolution ("LTE"), Evolved Universal Terrestrial Radio Access Network ("E-UTRAN"), and/or the like. Additionally, for example, the apparatus 700 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 700. For example, the processor 20 may comprise a digital signal processor device, a microprocessor device, an analog-to-digital converter, a digital-to-analog converter, and/or the like. Control and signal processing functions of the apparatus 700 may be allocated between these devices according to their respective capabilities. The processor 20 may additionally comprise an internal voice coder (VC) 20a, an internal data modem ("DM") 20b, and/or the like. Further, the processor 20 may include functionality to operate one or more software programs, which may be stored in memory. In general, processor 20 and stored software instructions may be configured to cause apparatus 700 to perform actions. For example, processor 20 may be capable of operating a connectivity program, such as, a web browser. The connectivity program may allow the apparatus 700 to transmit and receive web content, such as location-based content, according to a protocol, such as, wireless application protocol, WAP, hypertext transfer protocol, HTTP, and/or the like.

Apparatus 700 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 700 may include a battery for powering various circuits related to the mobile terminal, for example, a circuit to provide mechanical vibration as a detectable output. The user input interface may comprise devices allowing the apparatus 700 to receive data. Apparatus 700 may include a keypad 30 (which can be a virtual keyboard presented on display 28 or an externally coupled keyboard) and/or other input devices.

Moreover, the apparatus 700 may include a short-range radio frequency ("RF") transceiver and/or interrogator 64, so data may be shared with and/or obtained from electronic devices in accordance with RF techniques. The apparatus 700 may include other short-range transceivers, such as an infrared ("IR") transceiver 66, a Bluetooth ("BT") transceiver 68 operating using Bluetooth wireless technology, a wireless universal serial bus (USB) transceiver 70, and/or the like. The Bluetooth transceiver 68 may be capable of operating according to low power or ultra-low power Bluetooth technology, for example, Wibree, radio standards. In this regard, the apparatus 700 and, in particular, the short-range transceiver may be capable of transmitting data to and/or receiving data from electronic devices within proximity of the apparatus, such as within 10 meters. The apparatus 700 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 700 may comprise memory, such as, a subscriber identity module ("SIM") 38, a removable user identity module ("R-UIM"), and/or the like, which may store information elements related to a mobile subscriber. In addition to the SIM, the apparatus 700 may include other removable and/or fixed memory. The apparatus 700 may include volatile memory 40 and/or non-volatile memory 42. For example, volatile memory 40 may include Random Access Memory ("RAM") including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory ("NVRAM"), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of a user equipment/mobile terminal. The memories may comprise an identifier, such as an international mobile equipment identification ("IMEI") code, capable of uniquely identifying apparatus 700. The functions may include one or more of the operations disclosed herein with respect to the process flow of FIG. 6, and the like. The memories may comprise an identifier, such as, an international mobile equipment identification ("IMEI") code, capable of uniquely identifying apparatus 700. In the example embodiment, the processor 20 may be configured using computer code stored at memory 40 and/or 42 to provide the operations disclosed with respect to the process shown in FIG. 6 and the like.

Some of the embodiments disclosed herein may be implemented in software, hardware, application logic, or a combination of software, hardware, and application logic. The software, application logic, and/or hardware may reside in memory 40, the control apparatus 20, or electronic components disclosed herein, for example. In some example embodiments, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIGS. 1, 2, 3 and/or 6. A computer-readable medium may comprise a non-transitory computer-readable storage medium that may be any media that can contain or store the instructions for use by or in connection with an instruction execution system, apparatus, or device, such as a computer. Furthermore, some of the embodiments disclosed herein include computer programs configured to cause methods as disclosed herein (see, for example, the process of FIG. 6, and the like).

The subject matter described herein may be embodied in systems, apparatus, methods, and/or articles depending on the desired configuration. For example, the systems, apparatus, methods, and/or articles described herein can be implemented using one or more of the following: electronic components such as transistors, inductors, capacitors, resistors, and the like, a processor executing program code, an application-specific integrated circuit (ASIC), a digital signal processor (DSP), an embedded processor, a field programmable gate array (FPGA), and/or combinations thereof. These various example embodiments may include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "machine-readable medium" refers to any computer program product, computer-readable medium, computer-readable storage medium, apparatus and/or device (for example, magnetic discs, optical disks, memory, Programmable Logic Devices (PLDs) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although some of the examples described herein refer to the use of specific technologies, such as LTE, Wi-Fi, and the like, the subject matter described herein is not limited to those technologies, and, as such, can be used with other radio technologies as well.

Although a few variations have been described in detail above, other modifications or additions are possible. In particular, further features and/or variations may be provided in addition to those set forth herein. Moreover, the example embodiments described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

What is claimed:

1. A method, comprising:
   determining one or more peak values in a series of data samples of a communication signal;
   generating a peak queue comprising the one or more peak values that exceed a threshold value and a corresponding index value for each peak value;
   generating, from the peak queue, an entry to a clip table, the entry including a clip coefficient at the corresponding index value;
   updating the clip table to include a new clip coefficient at a new corresponding index value when a clip function squared at the new corresponding index value exceeds a scaled output power for an input power at the new corresponding index value; and
   clipping the series of data samples in a neighborhood of each peak value according to the clip function.

2. The method of claim 1, further comprising:
   removing a selected entry from the clip table when the selected entry does not affect the series of data samples.

3. The method of claim 1, further comprising:
   determining the clip function from at least the clip table, the clip coefficient, and a clip pulse.

4. The method of claim 3, wherein the clip function $C(k)$ at a first corresponding index value k is calculated according to:

$$C(k) = \prod_{(n, K_n) \in ClipTable} (1 - K_n C_n(k))$$

wherein $C(k)$ is the clip function value at sample k, $K_n$ is the clip coefficient for the peak at sample index n, and $C_n(k)$ is the clip pulse for the peak at the sample index n.

5. The method of claim 4, wherein the clip pulse, $C_n(k)$, is calculated according to:

$$C_n(k) = \begin{cases} B_{|n-k|} & \text{if } |n-k| < A \\ 0 & \text{otherwise} \end{cases}$$

wherein $B_{|n-k|}$ is a value of a clip shape at a sample point $|n-k|$, A is an integer with value of one half a width of the clip shape in index value, and wherein the clip shape comprises a windowed Gaussian.

6. The method of claim 5, wherein the neighborhood of each peak value comprises index values between the corresponding index value for each peak value minus the integer value A to the corresponding index value for each peak value added to the integer value A.

7. The method of claim 1, wherein a first peak value is determined from a current data value at a current index value and data values at two immediately preceding index values.

8. The method of claim 1, wherein the clip table comprises the clip coefficient value at the corresponding index value for the peak value according to: ClipTable={(n, $K_n$) for all active peaks at index values n}, wherein $K_n$ is the clip coefficient for the peak at sample index n.

9. The method of claim 1, wherein the clip coefficient, $K_n$, is calculated according to:

$$K_n = 1 - \frac{1}{C(n)}\sqrt{\frac{R(P_n)}{P_n}}$$

wherein $C(n)$ is the clip function at an index n, and $R(P_n)$ is the scaled output power for a data sample power $P_n$, and wherein $C(n)$ is calculated before the updating the clip table to include the new clip coefficient, $K_n$, at the new corresponding index, n.

10. The method of claim 1, wherein the scaled output power R(p) for input power p is calculated according to:

$$R(p) = H - (H-L)e^{-(p-L)/(H-L)}$$

wherein H is a predetermined upper threshold value, L is a predetermined lower threshold value, and e is a natural exponential.

11. A system comprising:
    at least one data processor;
    memory storing instructions which, when executed by the at least one data processor, causes the at least one data processor to perform operations comprising:
    determining one or more peak values in a series of data samples of a communication signal;
    generating a peak queue comprising the one or more peak values that exceed a threshold value and a corresponding index value for each peak value;
    generating, from the peak queue, an entry to a clip table, the entry including a clip coefficient at the corresponding index value;
    updating the clip table to include a new clip coefficient at a new corresponding index value when a clip function squared at the new corresponding index value exceeds a scaled output power for an input power at the new corresponding index value; and
    clipping the series of data samples in a neighborhood of each peak value according to a clip function.

12. The system of claim 11, further comprising:
    removing a selected entry from the clip table when the selected entry does not affect the series of data samples.

13. The system of claim 11, further comprising:
    determining the clip function from at least the clip table, the clip coefficient, and a clip pulse.

14. The system of claim 13, wherein the clip function $C(k)$ at a first corresponding index value k is calculated according to:

$$C(k) = \prod_{(n, K_n) \in ClipTable} (1 - K_n C_n(k))$$

wherein $C(k)$ is the clip function value at sample k, $K_n$ is the clip coefficient for the peak at sample index n, and $C_n(k)$ is the clip pulse for the peak at the sample index n.

15. The system of claim 14, wherein the clip pulse, $C_n(k)$, is calculated according to:

$$C_n(k) = \begin{cases} B_{|n-k|} & \text{if } |n-k| < A \\ 0 & \text{otherwise} \end{cases}$$

wherein $B_{|n-k|}$ is a value of a clip shape at a sample point $|n-k|$, A is an integer with value of one half a width of the clip shape in index value, and wherein the clip shape comprises a windowed Gaussian.

16. The system of claim 15, wherein the neighborhood of each peak value comprises index values between the corresponding index value for each peak value minus the integer value A to the corresponding index value for each peak value added to the integer value A.

17. The system of claim 11, wherein a first peak value is determined from a current data value at a current index value and data values at two immediately preceding index values.

18. The system of claim 11, wherein the clip table comprises the clip coefficient value at the corresponding index value for the peak value according to: ClipTable={(n, $K_n$) for all active peaks at index values n}}, wherein $K_n$ is the clip coefficient for the peak at sample index n.

19. The system of claim 11, wherein the clip coefficient, $K_n$, is calculated according to:

$$K_n = 1 - \frac{1}{C(n)}\sqrt{\frac{R(P_n)}{P_n}}$$

wherein C(n) is the clip function at an index n, and $R(P_n)$ is the scaled output power for a data sample power $P_n$, and wherein C(n) is calculated before the updating the clip table to include the new clip coefficient, $K_n$, at the new corresponding index, n.

20. The system of claim 11, wherein the scaled output power R(p) for input power p is calculated according to:

$$R(p) = H - (H-L)e^{-(p-L)/(H-L)}$$

wherein H is a predetermined upper threshold value, L is a predetermined lower threshold value, and e is a natural exponential.

21. A non-transitory computer program product storing instructions, which when executed by at least one data processor of at least one computing system, implement a method comprising:
determining one or more peak values in a series of data samples of a communication signal;
generating a peak queue comprising the one or more peak values that exceed a threshold value and a corresponding index value for each peak value;
generating, from the peak queue, an entry to a clip table, the entry including a clip coefficient at the corresponding index value;
updating the clip table to include a new clip coefficient at a new corresponding index value when a clip function squared at the new corresponding index value exceeds a scaled output power for an input power at the new corresponding index value; and
clipping the series of data samples in a neighborhood of each peak value according to a clip function.

22. The non-transitory computer program product of claim 21, further comprising:
removing a selected entry from the clip table when the selected entry does not affect the series of data samples.

23. The non-transitory computer program product of claim 21, further comprising:
determining the clip function from at least the clip table, the clip coefficient, and a clip pulse.

24. The non-transitory computer program product of claim 23, wherein the clip function C(k) at a first corresponding index value k is calculated according to:

$$C(k) = \prod_{(n,K_n) \in ClipTable} (1 - K_n C_n(k))$$

wherein C(k) is the clip function value at sample k, $K_n$ is the clip coefficient for the peak at sample index n, and $C_n(k)$ is the clip pulse for the peak at the sample index n.

25. The non-transitory computer program product of claim 24, wherein the clip pulse, $C_n(k)$, is calculated according to:

$$C_n(k) = \begin{cases} B_{|n-k|} & \text{if } |n-k| < A \\ 0 & \text{otherwise} \end{cases}$$

wherein $B_{|n-k|}$ is a value of a clip shape at a sample point |n−k|, A is an integer with value of one half a width of the clip shape in index value, and wherein the clip shape comprises a windowed Gaussian.

26. The non-transitory computer program product of claim 25, wherein the neighborhood of each peak value comprises index values between the corresponding index value for each peak minus the integer value A to the corresponding index value for each peak value and added to the integer value A.

27. The non-transitory computer program product of claim 21, wherein a first peak value is determined from a current data value at a current index value and data values at two immediately preceding index values.

28. The non-transitory computer program product of claim 21, wherein the clip table comprises the clip coefficient value at the corresponding index value for the peak value according to: ClipTable={(n, $K_n$) for all active peaks at index values n}}, wherein $K_n$ is the clip coefficient for the peak at sample index n.

29. The non-transitory computer program product of claim 21, wherein the clip coefficient, $K_n$, is calculated according to:

$$K_n = 1 - \frac{1}{C(n)}\sqrt{\frac{R(P_n)}{P_n}}$$

wherein C(n) is the clip function at an index n, and $R(P_n)$ is the scaled output power for a data sample power $P_n$, and wherein C(n) is calculated before the updating the clip table to include the new clip coefficient, $K_n$, at the new corresponding index, n.

30. The non-transitory computer program product of claim 21, wherein the scaled output power R(p) for input power p is calculated according to:

$$R(p) = H - (H-L)e^{-(p-L)/(H-L)}$$

wherein H is a predetermined upper threshold value, L is a predetermined lower threshold value, and e is a natural exponential.

* * * * *